Jan. 26, 1960  E. T. JANSSON  2,922,394
ADJUSTABLE MILKING MACHINE CLAW
Filed April 5, 1957
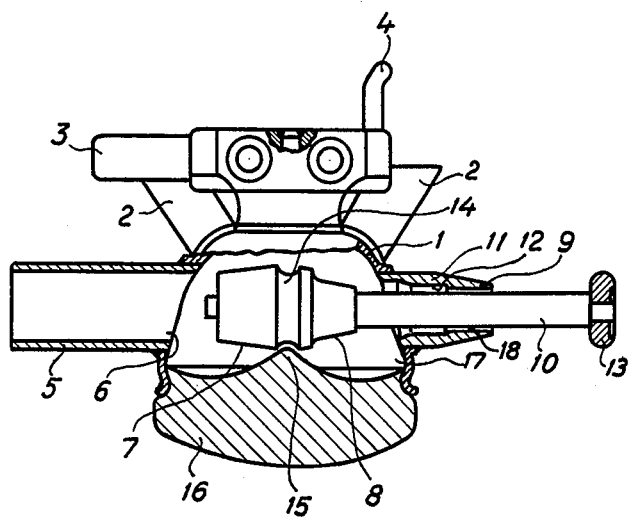
INVENTOR.
Ernst Tage Jansson
BY
Davis, Hoxie & Faithfull
ATTORNEYS

United States Patent Office 2,922,394
Patented Jan. 26, 1960

2,922,394

ADJUSTABLE MILKING MACHINE CLAW

Ernst Tage Jansson, Stockholm, Sweden, assignor to Aktiebolaget Separator, Stockholm, Sweden, a corporation of Sweden Application April 5, 1957, Serial No. 651,037

Claims priority, application Sweden April 12, 1956

6 Claims. (Cl. 119—14.55)

The present invention refers to a milk claw of a milking machine plant which in the first place is provided with means intended to shut off the joined flow of milk discharged from the milk claw.

For this purpose it is previously known to design the milk claw, as a compact housing with a throughgoing boring into which several inlet pipes connected to teat cup milk lines and one discharge pipe open out in such a way that the discharge pipe can be shut off from its communication with the inlet pipes by displacement of a slide arranged in the boring.

According to a principal feature of the present invention, a shut-off device provided with a rod is movably located in the milk claw housing and designed with a contact surface for cooperation partly with the mouth of a discharge pipe from the housing, to shut off the joined flow of milk, partly with an opening towards the inner side of the housing for the rod, to shut-off said opening and thereby prevent leakage between the opening and the rod when cleaning the milk claw with a disinfectant.

The shut-off device according to the invention thus serves, in the milk claw, simultaneously as a device to shut off discharge of the collected milk flow and as a means to prevent leakage of disinfectant when cleaning. The shut-off device with its rod can also be arranged with an adjusting device for detachably holding the shut-off device in an intermediate position about half-way between the position for shutting off the milk flow through the discharge pipe and the position for preventing leakage between the housing and the opening for the rod.

According to one embodiment of the invention the opening in the housing for the rod is so much greater in cross section than the cross section of the rod that the difference in cross section forms a slot which permits entering of air from the outside into the interior of the housing through said slot. This arrangement facilitates discharging of the milk through the discharge pipe of the housing, when the shut-off device is in between its end positions.

The attached drawing shows a milk claw with a shut-off device according to an embodiment of the present invention, in which the milk claw consists of a housing 1 with connection pipes 2, usually four pipes, for milk tubes from teat-cups and with connection nipples 3, usually two nipples for vacuum pulse tubes for the said teat cups. An eye 4 is arranged on the top of the milk claw for supporting the latter, when not in use, together with the teat cups, with their appurtenant connecting tubes, connected to the milk claw. The milk claw is further provided with a discharge pipe 5 for the joined milk flows coming from the teat cups and passing through the interior of the housing 1 of the milk claw. The mouth 6 of this discharge pipe 5 in the milk claw housing 1 is closable by a conically tapering contact surface 7 at one end of a shut-off device (7, 8). The other end of this is also formed with a conically tapering contact surface 8 to bring about a sealing contact against a bushing 9 fixed to the milk claw housing 1 and surrounding and directing a rod 10 supporting the shut-off device. The bushing 9 is the outer end of a tubular part 11 fixed to the milk claw housing 1, the interior of the said tubular part being shaped with an annular interior contact surface 12. This contact surface 12 is shaped to constitute a seat for the contact surface 8, facing the outer end of the rod 10, of the shut-off device so that this contact surface 8 when moved towards the bushing 9 of the rod 10 with certainty can seal a slot 18 between the rod 10 and the bushing 9 against leakage of disinfectant when cleaning the milk claw.

The rod 10 is fitted with a handle 13 situated outside the milk claw housing 1 at the end of the rod, by means of which handle it can be manually moved outwards and inwards in the milk claw housing. When the rod 10 is in the position shown in the drawing, the shut-off device is held in an intermediate position about half-way between the position for shutting off the milk flow through the discharge pipe 5 and the position for preventing leakage of disinfectant through the bushing 9. For this purpose the shut-off device is provided, at its centre, with an annular recess 14, into which an upturned edge or projection 15 on a plug 16 is arranged to engage. The plug 16 is detachably inserted into an opening 17 in the milk claw housing 1. The upturned edge 15 is arranged at the centre of the said plug 16. The plug 16 is made of rubber or some other similar elastic material so that its upturned edge 15 is elastically inserted into the annular recess 14 for holding the shut-off device and at the same time can be easily pushed out of the said recess 14 when displacing the shut-off device by means of the rod 10.

In the position when the up-turned edge 15 is in engagement with the annular recess 14 for holding the shut-off device in between its end positions, the slot 18 is open for air to enter into the interior of the housing 1 which facilitates discharging of the milk through the pipe 5. Thus, the part 15 forms a detent means for releasably holding the rod 10 intermediate its end positions so that both the slot 18 and the discharge pipe 5 are maintained open to the interior of the housing.

The invention is not confined to the embodiment shown in the drawing but can be executed in several other ways. Thus, the shut-off device can be shaped as a ball which in the intermediate position between the end contact positions is held by a shallow spherical recess in the milk claw housing or in a plug inserted in an opening in the said housing. The shut-off device can also be shaped as a double cone with opposing basal surfaces without any annular slot in these or with a protruding ring adjoining these basal surfaces. In the latter case the plug in the milk claw housing is arranged with a holding slot corresponding to the section of the ring. In the former case, the rod, to hold the shut-off device in a determined position, is arranged with an annular recess cooperating with a spring-loaded ball suitably situated outside the milk claw housing. In this embodiment, annular slots can suitably be arranged on the rod also for holding the shut-off device in its two end positions by providing the rod with three slots at the side of each other.

I claim:

1. In a milk claw for a milking machine plant, having a closed housing, connection pipes fixed to and opening into said housing for connection with teat cup milk lines, and a discharge pipe having a mouth opening into the housing for discharging milk entering the interior of the housing through said connection pipes, the improvement which comprises a tubular part connected to said housing in alignment with and directly opposite said discharge pipe, a rod slidable in said tubular part and having a maximum cross section smaller than the hole area of the tubular part, whereby said rod and tubular part form a flow passage leading into the interior of the housing, the tubular part forming an annular interior contact surface defining the inner end of said passage opening into the housing, the rod being slidable axially in the tubular part toward and away from said mouth of the discharge pipe, a shut-off device in the housing connected to the rod and slidable therewith to close said mouth of the discharge pipe in one extreme end position of the rod and to close said passage in the tubular part in the other extreme end position of the rod, the shut-off device having a valve surface tapering toward said contact surface and engageable therewith to close said passage and hold the rod against axial movement away from said mouth of the discharge pipe when the rod is in said other extreme end position, said mouth of the discharge pipe engaging the shut-off device in said one extreme end position of the rod to hold the rod against axial movement toward said mouth, said rod having an intermediate position in which both said passage and said discharge pipe are maintained open to the interior of the housing, and detent means for releasably holding the rod in said intermediate position.

2. The improvement according to claim 1, in which said rod is manually operable from the outside of the housing.

3. The improvement according to claim 1, in which said shut-off device at each end is provided with a conical contact surface to enter the mouth of said discharge pipe and the inner end of the tubular part, respectively.

4. The improvement according to claim 1, in which said detent means include a part on the housing engageable with a coacting part movable with said rod.

5. The improvement according to claim 1, in which said shut-off device has a recess, said detent means including a projection on the housing engageable in said recess.

6. The improvement according to claim 1, in which the housing has a bottom opening and includes a removable plug closing said opening, said detent means being on the plug.

References Cited in the file of this patent

UNITED STATES PATENTS 2,694,380     Harstick _____ Nov. 16, 1954

FOREIGN PATENTS 563,390     Great Britain _____ Aug. 11, 1944